US011426636B2

(12) United States Patent
Cesareo et al.

(10) Patent No.: US 11,426,636 B2
(45) Date of Patent: Aug. 30, 2022

(54) GOLF BALL COMPRISING GRAPHENE

(71) Applicant: DIRECTA PLUS S.P.A., Lomazzo (IT)

(72) Inventors: Giulio Giuseppe Cesareo, Como (IT);
Massimiliano Bianchi, Carate Brianza (IT); Antonino Di Pasquale, Basiglio (IT)

(73) Assignee: Directa Plus S.p.A., Lomazzo (IT)

( * ) Notice: Subject to any disclaimer, the term of this patent is extended or adjusted under 35 U.S.C. 154(b) by 218 days.

(21) Appl. No.: 16/468,358

(22) PCT Filed: Dec. 12, 2017

(86) PCT No.: PCT/EP2017/082364
§ 371 (c)(1),
(2) Date: Jun. 11, 2019

(87) PCT Pub. No.: WO2018/114466
PCT Pub. Date: Jun. 28, 2018

(65) Prior Publication Data
US 2019/0329100 A1  Oct. 31, 2019

(30) Foreign Application Priority Data

Dec. 23, 2016 (IT) .................. 102016000130609

(51) Int. Cl.
*A63B 37/04* (2006.01)
*A63B 37/00* (2006.01)
(Continued)

(52) U.S. Cl.
CPC ...... *A63B 37/0054* (2013.01); *A63B 37/0076* (2013.01); *C08F 36/06* (2013.01);
(Continued)

(58) Field of Classification Search
CPC .................................................. A63B 37/0051
See application file for complete search history.

(56) References Cited

U.S. PATENT DOCUMENTS 7,156,756 B2    1/2007  Sullivan et al.
9,717,956 B2 *  8/2017  DuFaux ............ A63B 37/0075
(Continued)

FOREIGN PATENT DOCUMENTS

WO  WO 2014/135455 A1 *  9/2014
WO     2015058190 A1      4/2015
WO     2015193267 A1     12/2015

OTHER PUBLICATIONS

Jesus de La Fuente, What is Graphene, uploaded Jan. 29, 20, Graphenea.com, 12 pages.*
(Continued)

*Primary Examiner* — Eugene L Kim
*Assistant Examiner* — Matthew B Stanczak
(74) *Attorney, Agent, or Firm* — Patterson Intellectual Property Law, P.C.

(57) ABSTRACT

Golf ball consisting of an inner part comprising at least an elastomeric polymer and a reinforcing agent comprising graphene nano-platelets in which at least 90% of the nano-platelets has a lateral size (x, y) from 50 to 50,000 nm and a thickness (z) from 0.34 to 45 nm, and a C/O ratio ≥100:1.

20 Claims, 3 Drawing Sheets

(51) Int. Cl.
*C08K 3/04* (2006.01)
*C08F 36/06* (2006.01)

(52) U.S. Cl.
CPC ........ *C08K 3/042* (2017.05); *C08K 2201/004* (2013.01); *C08K 2201/011* (2013.01)

(56) References Cited

U.S. PATENT DOCUMENTS

| | | | | |
|---|---|---|---|---|
| 9,789,366 | B1* | 10/2017 | Chavan | A63B 37/0043 |
| 10,052,524 | B1* | 8/2018 | Chavan | A63B 37/0074 |
| 10,058,741 | B1* | 8/2018 | Chavan | A63B 37/0054 |
| 10,086,237 | B1* | 10/2018 | Chavan | A63B 37/0023 |
| 10,252,114 | B1* | 4/2019 | Petrich | A63B 37/0092 |
| 10,376,744 | B1* | 8/2019 | Petrich | A63B 37/0049 |
| 10,500,445 | B1* | 12/2019 | Chavan | A63B 37/0039 |
| 10,507,362 | B1* | 12/2019 | Chavan | A63B 37/0077 |
| 2005/0020385 | A1* | 1/2005 | Onoda | A63B 37/0003 473/371 |
| 2006/0270790 | A1* | 11/2006 | Comeau | A63B 37/12 524/847 |
| 2008/0048152 | A1* | 2/2008 | Jang | C01B 32/19 252/378 R |
| 2014/0155544 | A1* | 6/2014 | Du | C08L 9/06 524/575.5 |
| 2015/0133593 | A1* | 5/2015 | Kissell | C08K 3/041 524/496 |
| 2015/0218002 | A1* | 8/2015 | Plomb | C01B 32/23 423/448 |
| 2015/0343270 | A1* | 12/2015 | DuFaux | A63B 37/006 473/373 |
| 2015/0375051 | A1* | 12/2015 | Shiga | C08K 3/045 473/374 |
| 2015/0375062 | A1* | 12/2015 | Farrell | A63B 37/0064 473/376 |
| 2015/0376014 | A1* | 12/2015 | Cesareo | C09D 7/61 442/86 |
| 2016/0279482 | A1* | 9/2016 | DuFaux | A63B 37/0054 |
| 2017/0028262 | A1* | 2/2017 | Nagakura | A63B 37/0063 |
| 2017/0190583 | A1* | 7/2017 | Cesareo | C01B 32/19 |
| 2018/0092256 | A1* | 3/2018 | Braley | C04B 35/5935 |
| 2018/0215904 | A1* | 8/2018 | Cesareo | C08L 9/00 |

OTHER PUBLICATIONS

Janz B Z et al: "Processing of nanographene platelets (NPGs) and NPG composites : a review," Journal of Materials Science, Kluwer Academic Publishers, BO, vol. 43, Jan. 1, 2008 (Jan. 1, 2008), pp. 5092-5101, XP002631601, ISSN: 1573-4803, DOI: 10.1007/S10853-08-2755-2 [retrieved on Jun. 24, 2008].

Internatonal Search Authority: PCT Notification of Transmittal of the International Search Report and the Written Opinion of the International Searching Authority, or the Declaration, for PCT/EP2017/082364, European Patent Office, dated Mar. 15, 2018.

* cited by examiner

GOLF BALL COMPRISING GRAPHENE

The present invention relates to a golf ball comprising graphene.

A golf ball usually consists of a rubber or synthetic elastomeric core and of an outer layer provided with dimples, made of a polymeric material suitable to withstand the impact with the club during the hit. According to the type of ball and the destination for amateur or professional use, the structure of the ball can comprise one or more intermediate layers between the core and the outer layer. These intermediate layers are made of polymers or polymer compounds and/or polymer composites, typically comprising also a rubber or synthetic elastomer.

In the majority of golf balls currently in use the rubber core is made of polybutadiene and the outer layer of ionomer resin. The ionomer outer layer ensures a longer range, i.e., a high flight distance, and long useful life. However, the sensation upon impact is of hardness, and, considering the short contact time with the club, the possibility of controlling the ball is limited.

Therefore, to obtain a sensation of softness and improve control of the shot, in recent years golf balls have also been proposed provided with one or more intermediate layers of soft material, or of an outer layer formed of a relatively soft material.

Therefore, the properties required for golf balls include a sensation of softness during impact, controllability of the shot and a long flight distance.

When soft materials are used for each layer, the sensation of softness during impact is improved, but the flight distance is reduced. On the contrary, when hard materials are used, the flight distance increases but the sensation during impact is hard.

Moreover, golf balls must have a useful life suitable to withstand severe conditions of use. Due to strong impacts, surface splits or cracking can be produced, which spread deteriorating or flattening the dimples and at most causing the surface layer to break. To prevent the spread of splits or other damage to the surface, it is possible to use materials with high tensile strength and elongation at break, or hard materials, which however give a sensation of hardness upon impact.

Therefore, it is difficult to produce a golf ball that provides both a soft impact and a long range.

Numerous patents describe the structure of golf balls and the composition and the features of the core and/or of the intermediate layers and/or of the outer layer of golf balls.

U.S. Pat. No. 7,220,191 B2 describes a high strength golf ball comprising a core, one or more intermediate layers and an outer layer, in which carbon nanotubes are contained in at least one of these parts. However, the user of carbon nanotubes can cause some problems.

Firstly, they present a toxicological risk due to the fact that they have nanometric sizes and therefore behave like nanofibers that can penetrate the cells and trigger inflammatory reactions.

Secondly, nanotubes are difficult to process as they agglomerate stably and their correct dispersion in a matrix is extremely difficult to achieve.

Thirdly, nanotubes can essentially only be used at low concentrations (around 1 wt %), as they cause a sudden increase of the viscosity of the matrix, making it difficult to process the material in which they are contained in high concentrations.

WO 2015/058190 A1 describes a golf ball with a core exhibiting high stiffness made of a composite polymer material comprising an organic or inorganic strengthening phase. Carbon fibers, carbon nanotubes and graphene are also cited among the various substances that can constitute this strengthening phase. In this latter case, no information is provided in relation to the features that the graphene requires to have for this application.

Jang B Z et al, "Processing of nanographene platelets (NPGs) and NPG nanocomposites: a review", Journal of Material Science, Kluwer Academic Publishers, BO, vol. 43, 1 Jan. 2008, p. 5092-5101, discloses that NPG nanocomposites have been used in making golf balls. No information is provided in relation to the features that the graphene platelets have, or must have, for this application.

US 2015/0375062 A1 describes a golf ball with a moisture vapor barrier (MVB) layer comprising at least one layer formed from graphene. Methods to manufacture graphene films are disclosed, typically starting from graphene oxide (GO), which is then reduced, although some oxygen groups remain on the surface after reduction. Thin films of GO can be prepared with the Langmuir-Blodgett, drop-casting, dip-coating, spraying, electrophoresis, vacuum-filtration and spin-coating methods. Formation of a continuous, thin film of graphene, or of graphene oxide, may be a good way of improving the MVB properties of a golf ball but it is not an effective way to improve the mechanical properties of the ball.

Therefore, the problem of obtaining a golf ball capable of providing a soft impact, hence good control of the ball also by not particularly experienced players, and a long range, i.e., a long flight distance, has still not been solved or has not been solved in a satisfactory manner. It would also be desirable to obtain a golf ball capable of withstanding severe conditions of use over time.

Therefore, an object of the present invention is to provide a golf ball that offers improved balance between the properties of controlling the impact and the trajectory imparted by the player and the ability to obtain a long flight distance.

Another object of the present invention is to provide a golf ball capable of withstanding particular environmental conditions and severe conditions of use resulting from repeated impacts in the long term, without being damaged.

The aforesaid and other objects and advantages of the invention are achieved with a golf ball consisting of:
a) an inner part comprising at least an elastomeric polymer and at least a reinforcing agent; and
b) an outer part comprising a coating layer provided with dimples;
characterized in that said reinforcing agent comprises graphene nano-platelets having the following features:
i. at least 90% of said graphene nano-platelets have a lateral size (x, y) from 50 to 50,000 nm, and a thickness (z) from 0.34 to 45 nm, wherein the lateral size is always greater than the thickness (x, y>z);
ii. the C/O ratio in said graphene nano-platelets is $\geq$100:1, more preferably $\geq$200:1.

The inner part can consist of only a spherical core or of a spherical core and one or more intermediate layers located between the spherical core and the outer part.

According to an aspect of the present invention, the reinforcing agent comprising graphene nano-platelets is dispersed within the elastomeric polymer of the inner part of the golf ball. Therefore, the graphene nano-platelets are dispersed within said inner part of said golf ball.

The invention will now be described with reference to the accompanying figures, wherein.

Figure 1:
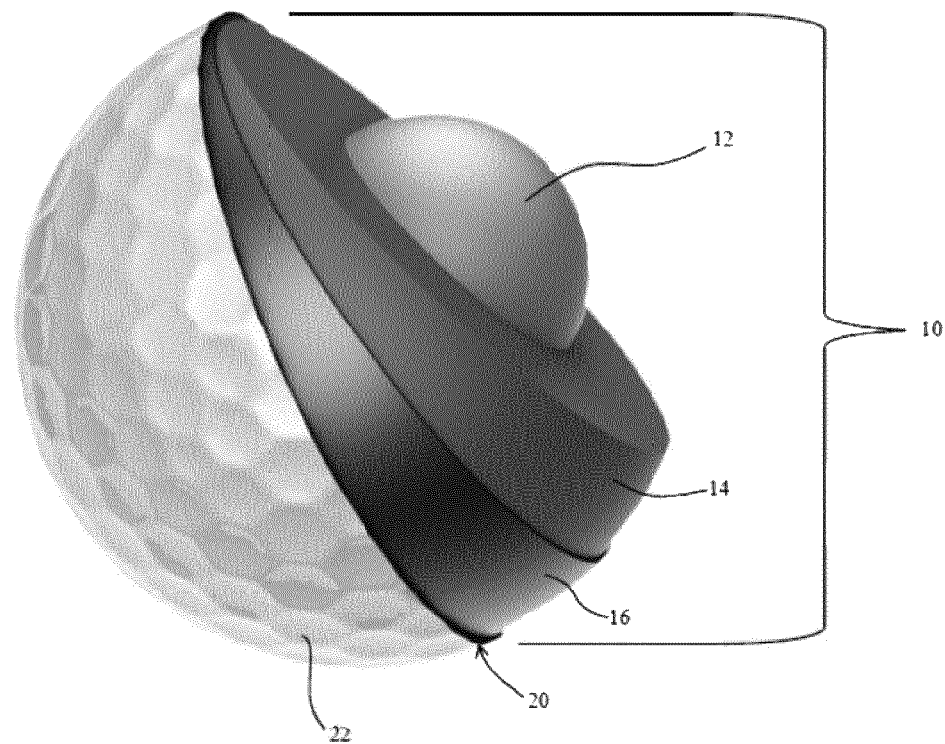
FIG. 1 is a schematic sectional representation of a golf ball.

With reference to FIG. 1, there is represented a golf ball consisting of an inner part 10 comprising a spherical core 12 and two intermediate layers 14, 16, and an outer part comprising a shell 20 provided with dimples 22. Therefore, this is a ball with four components, as known in the art. Balls with three components, i.e., with a single intermediate layer, and with two components, i.e., with a spherical core covered by an outer shell, are also known. Golf balls with more than four components are also known and/or described.

The outer part comprising the shell 20 provided with dimples 22 is produced according to the prior art. Typically, it comprises an ionomer, i.e., a copolymer provided with ion groups. A type of ionomer suitable for this application is the copolymer ethylene-methacrylic acid. An example of this copolymer is marketed by DuPont with the trade name Surlyn®.

The inner part 10 comprises at least an elastomeric polymer and a reinforcing agent, as known in the art.

The elastomeric polymer is selected from the group consisting of polybutadiene, natural rubber, polyisoprene, styrene-butadiene rubber, ethylene-propylene-diene (EPDM) rubber and mixtures thereof.

The preferred elastomeric polymer is polybutadiene. More preferably, the polybutadiene is of the type with high content of 1,4 cis units, of the type obtained with neodymium catalysts, i.e., polybutadiene containing from 40 to 98% of 1,4-cis units.

If the inner part 10 comprises a core 12 and at least an intermediate layer 14, the core comprises an elastomeric polymer and the intermediate layer can comprise an elastomeric polymer optionally mixed with other polymers, or can comprise one or more different polymers, with or without elastomeric properties or with limited elastomeric properties. Examples of these polymers are ionomers, polyetheramides, polyurethanes, as known in the art.

According to another embodiment, the inner part 10 further comprises a second intermediate layer 16, which can also comprise an elastomeric polymer optionally mixed with other polymers, or can comprise one or more different polymers, with or without elastomeric properties or with limited elastomeric properties, as in the case of the first intermediate layer 14.

Naturally, embodiments with more than two intermediate layers are also possible. In any case, when there are one or more intermediate layers containing an elastomeric polymer, a reinforcing agent according to the invention can be present in these layers.

The stiffness of the inner part 10 performs an important role in determining the performance of the golf ball. Therefore, an essential parameter for the performance of the ball is the elastic modulus E, expressed in Pa. For this reason, the elastomeric polymer is mixed with a reinforcing agent selected to improve the stiffness thereof.

The reinforcing agent comprises graphene nano-platelets and optionally one or more chemical compounds known as conventional reinforcing agent. The reinforcing agent, however, can also consist of graphene nano-platelets only.

Mixing of the reinforcing agent in the elastomeric polymer brings about a dispersion and distribution of the reinforcing agent within the inner part of the golf ball.

According to the present invention, the reinforcing agent comprises graphene nano-platelets having the following features:
i. at least 90% of said graphene nano-platelets has a lateral size (x, y) from 50 to 50,000 nm, and a thickness (z) from 0.34 to 45 nm, wherein the lateral size is always greater than the thickness (x, y>z);
ii. the C/O ratio in said graphene nano-platelets is ≥100:1, more preferably ≥200:1.

According to an aspect of the present invention, the graphene nano-platelets are present in an amount from 1 to 50 phr with respect to the weight of the elastomeric polymer, preferably in an amount from 2 to 30 phr with respect to said elastomeric polymer, more preferably in an amount from 2 and 20 phr with respect to said elastomeric polymer.

As a result of mixing the reinforcing agent in the elastomeric polymer, the graphene nano-platelets are dispersed and distributed in the elastomeric polymer. Uniform dispersion of the graphene nano-platelets in the elastomeric polymer improves the mechanical properties of the inner layer of the golf ball, and the performance of the golf ball as such.

Graphene is a material formed by a single atomic layer of $sp^2$ hybridized carbon atoms. These are arranged in hexagonal close-packed honeycomb structures that form the fundamental structural elements of graphite, of carbon nanotubes and of fullerenes.

Graphene is a material with unique properties: it is a zero band-gap semiconductor with high charge carrier mobility (up to 200,000 $cm^2$/Vs), very high mechanical strength (tensile strength ~40 N/m, Young's Modulus ~1.0 TPa), exceptional thermal conductivity (~5000 W/km) and high electric current carrying capacity (~1.2 mA/μm). These properties allow graphene to be used for applications in market segments that require the use of advanced materials. Therefore, graphene based materials are studied from a scientific and industrial point of view for applications in markets such as electronics, photovoltaics, batteries, sensors, optoelectronics and nanocomposites.

Scientific and patent literature describes various methods for the preparation of graphene, such as chemical vapor deposition, epitaxial growth, chemical exfoliation and chemical reduction of the oxidized form graphene oxide (GO).

EP 2 038 209 B1 by the same Applicant describes, among other things, a method for producing structures comprising graphene layers, obtained by intercalation and subsequent expansion/exfoliation of graphite.

WO 2015/193267 A1 by the same Applicant describes methods for producing aqueous dispersions of pristine graphene, from which it is possible to obtain graphene nano-platelets with a C/O ratio ≥1:100, and also ≥1:200. This ratio is important as it defines the maximum amount of oxygen bonded to the carbon forming the graphene. It is in fact known that the best properties of graphene, which derive from its high crystallographic quality, are obtained when the amount of oxygen is minimum.

A pristine graphene, i.e., with a C/O ratio ≥100:1, absence or minimum presence of reticular defects—detected using Raman spectroscopy—minimum presence or absence of extraneous substances, including surfactants or functionalizing agents or coupling agents of the graphene, forms a fundamental component for improving the properties of the reinforcing composition of the elastomeric polymer forming the inner part of the golf ball according to the invention. The C/O ratio in the graphene used in the reinforcing composition according to the invention is determined by means of elemental analysis performed by Elementa Analyzer (CHNS O), which provides the weight percentage of the various elements. By normalizing the values obtained with respect to the atomic weight of the C and O species and finding their ratio, the C/O ratio is obtained.

The reticular defects of the nano-platelets can be evaluated using Raman spectroscopy by analyzing the intensity and shape of the Peak D positioned at 1350 $cm^{-1}$.

According to preferred embodiments described in the patent documents mentioned above by the Applicant Directa Plus S.p.A., the process for producing pristine graphene is carried out in a continuous way by continuously feeding graphite flakes to the high temperature expansion step, continuously discharging the so-obtained expanded graphite in an aqueous medium and continuously subjecting the expanded graphite dispersed in the aqueous medium to the exfoliation and size reduction treatment carried out with the methods of ultrasonication and/or high pressure homogenization.

This process for producing pristine graphene comprises several steps.

The first step of the process consists in the preparation of expanded and/or exfoliated graphite starting from intercalated graphite.

The intercalated graphite can be prepared with methods known to those skilled in the art or purchased on the market. The expansion step of the intercalated graphite is performed by exposing flakes of intercalated graphite (Graphite Intercalation Compounds, GICs) having a lateral size ≤500 μm to a temperature from 1300 to 12000° C. for a time of less than 2 seconds. This treatment is performed as described in the patent EP 2038209 B1, i.e., by generating heat within the GICs, preferably using an electric arc, a microwave or high frequency induction furnace or by forming plasma. This last treatment is particularly preferred as it is possible to reach the temperature required associated with high turbulence.

The second step of the process comprises collecting the expanded graphite obtained in the first step and dispersing it in an aqueous medium, just after its formation.

Preferably, the expanded graphite is precipitated by gravity in a receptacle containing an aqueous medium in the absence of a surfactant or in the presence of a surfactant in an amount of less than 1% by weight of the weight of said graphite.

Contrary to the teachings of the prior art, if the expanded graphite just formed is added to an aqueous medium, optimal dispersion can be obtained without requiring to use a surfactant.

Obtaining an excellent aqueous dispersion of expanded graphite without the aid of surfactants represents an important advantage, both due to the decrease in costs resulting from saving on surfactant, and due to the improved properties of the end product, as will be better explained in the description below. However, a small amount of surfactant, less than 1% by weight, can be used without any significant decrease in the quality of the end product.

If dispersion of the expanded graphite is carried out in the presence of a surfactant, the surfactant is preferably an anionic surfactant, more preferably an anionic surfactant in which the anion forming the hydrophilic polar group is selected from sulfonate, sulfate, carboxylate and the hydrophobic nonpolar part is selected from structures comprising aromatic rings such as benzene, naphthalene, pyrene or cyclic aliphatic structures such as derivatives of cholic acid. A preferred surfactant is sodium benzenesulfonate.

Dispersion is obtained by light stirring.

The expanded graphite is dispersed in water at a concentration from 0.5% to 5% by weight, preferably from 1% to 4% by weight, more preferably from 2% to 3% by weight.

The third step of the process has the object of obtaining exfoliation and size reduction of the expanded graphite to obtain pristine graphene nano-platelets, at least 90% of which have a lateral size (x, y) from 50 to 50,000 nm and a thickness (z) from 0.34 to 45 nm, the lateral size being greater than the thickness (x, y >z).

This exfoliation and size reduction is obtained by subjecting the dispersion of the graphite in water, in which there is no surfactant or with an amount of surfactant of less than 1% by weight, to treatment with ultrasounds or to high pressure homogenization treatment in which the particles of expanded graphite are caused to collide.

The treatment with ultrasounds is carried out at an energy level from 10 to 200 Wh per gram of expanded graphite obtained in the preceding step.

Preferably the treatment of the aqueous dispersion of expanded graphite with ultrasounds is performed at an energy level of from 10 to 100 Wh per gram. The treatment with ultrasounds is performed using apparatus such as commercial ultrasonicators for treating liquids, where the acoustic energy is transmitted to the system by cavitation (formation and explosion of bubbles) using a sonotrode immersed in the liquid, with wave frequency of around 24 kHz, and with power as defined above.

The combination of the expansion treatment of the intercalated graphite at high temperature and of the subsequent ultrasonication treatment in a water medium enables both an exfoliation of the graphite and a reduction in the size thereof to be performed, obtaining graphene nano-platelets directly dispersed in water, in relatively rapid times.

The high-pressure homogenization treatment is performed with a homogenizer in which the dispersion of expanded graphite is pumped at a pressure above 35 MPa through one or more micro-channels or necks. Here the particles in dispersion are subjected to very high shear stresses, deriving from the sudden pressure drop, and to collision with one another and with the surfaces of these micro-channels or necks.

It must be specified that the term "neck" is intended as a reduction of the cross section of the duct substantially in one point through which the dispersion is forced to flow, while the term "micro-channel" is intended as a neck that extends in the direction of flow of the dispersion of particles.

This treatment allows a substantial size reduction of the expanded graphite to be obtained, up to the values according to the axes x, y and z mentioned previously. These necks can be of static type, such as flow channels having a maximum size of 500 μm, or of dynamic type, such as valves with a section that is adjustable so as to define a neck having a maximum size of 500 μm.

High pressure homogenization apparatus using necks of static type are marketed by Microfluidics International Corporation (Newton, Mass., U.S.A.) with the trade name Microfluidizer®. In these apparatus, the dispersion of expanded graphite is pumped at a pressure above 35 MPa through a plurality of flow channels having a maximum size of 500 μm, in which the particles of expanded graphite are caused to collide. Preferably, the maximum pressure is 500 MPa. The structure and the operation of this apparatus are also described, among other things, in the U.S. Pat. No. 8,367,004 B2.

High pressure homogenization apparatus using necks of dynamic type are marketed, among other things, by GEA NIRO-Soavi (Parma, Italy). The structure and the operation of these apparatus are also described, among other things, in the U.S. Pat. No. 4,773,833.

According to the amount of size reduction required, it is possible to treat the aqueous dispersion of expanded graphite several times in the homogenizer. This can be carried out in a continuous way, with various cycles through the homogenizer.

Preferably the high-pressure homogenization treatment is performed in a homogenizer in which the dispersion of expanded graphite is pumped at a pressure above 100 MPa through one or more micro-channels or necks.

As mentioned previously, the final dispersion of the graphene nano-platelets obtained after the exfoliation and size reduction treatment carried out with one or more of the methods defined above can be concentrated or dried, depending on the final form required for the graphene.

Concentration of the dispersion can be carried out with techniques known to those skilled in the art, such as removal of the water by evaporation, filtration or centrifugation. The absence—or minimum presence (less than 1%)—of surfactant allows the problem of its possible polymerization to be avoided and makes it possible to operate with higher temperatures, as well as to guarantee the feasibility of liquid-solid separation.

Using the techniques indicated above, it is possible to increase the concentration of the dispersion up to 30% by weight. The product that is obtained in a range of concentrations from 6 to 30% by weight has a high viscosity and the consistency of a paste, and can advantageously be used as masterbatch for water-based formulations.

The advantages deriving from the use of a concentrated dispersion in the range from 6 to 30% by weight are: 1) freedom of formulation, i.e., the possibility to dilute the product to the desired concentration and to choose the best surfactant for the specific application; 2) high dispersibility due to the presence of residual water that, interposed between the graphene nano-platelets, weakens the Van der Waals bonds that are established between them; 3) possibility to use the product directly by spreading on the desired substrate; 4) confinement of the graphene nano-platelets in a matrix, facilitating their handling and transport. A particularly advantageous method of concentrating the dispersion is that of filtration with removal of the water until obtaining a dispersion having a concentration in the desired range on the filter. The filtration system is controlled by adjusting on the treatment time and the filtration pressure. The filters are defined according to the surface area of the filter. A suitable filter system is one marketed with the trade name Funda® by Mavag AG.

The object of drying the dispersion is to obtain a dry powder that is easily redispersible in various matrices, both solvents and polymers, where liquid is not desirable or manageable at process level, or where water cannot be used due to chemical incompatibility.

The dispersion can be evaporated to dryness using prior art techniques, such as lyophilization, evaporation in a rotating evaporator or spray drying. In any case, the graphene nano-platelets produced in the absence of a surfactant exhibit a high degree of dispersibility. Moreover, on the one hand the low oxygen content and the absence of reticular defects ensure high physical and chemical properties and on the other guarantee the permanent absence of stable re-agglomeration of the nano-platelets, due to a chemical interaction of covalent type. The high aspect ratio (high lateral size and low thickness) ensures optimal performances in terms of electrical and thermal conductivity and barrier property.

A very important advantage of the process described consists in the possibility of operating without surfactant. In fact, the graphene nano-platelets thus obtained are highly pure, both due to the high C/O ratio and to the absence of extraneous substances that end up being contaminants, such as surfactants. In fact, it has been found that in the absence of surfactants it is possible to obtain graphene having substantially higher electrical conductivity than that of graphene obtained with processes that use surfactants. This improves the performance of the graphene in a plurality of applications.

Pristine graphene nano-platelets, at least 90% of which have a lateral size (x, y) from 50 to 50,000 nm and a thickness (z) from 0.34 to 45 nm, the lateral size being greater than the thickness (x, y >z), having a C/O ratio ≥100:1, have a high electrical conductivity. The electrical conductivity is determined on a film obtained by depositing an aqueous dispersion of said nano-platelets on a glass substrate forming a film of 1 cm×1 cm and dried using a heating plate at 100° C. for 15 minutes, and is measured in a Van der Pauw configuration. This film has an electrical conductivity ≥1500 S/m, preferably ≥2000 S/m.

It was also seen that when a dispersion of graphene nano-platelets is formed in the presence of a surfactant, this deposits on the surface thereof and tends to promote its agglomeration. In the present description the size of the graphene nano-platelets is defined with reference to a system of Cartesian axes x, y, z, it being understood that the particles are substantially flat platelets but may also have an irregular shape. In any case, the lateral size and the thickness provided with reference to the directions x, y and z must be intended as the maximum sizes in each of the aforesaid directions.

The lateral sizes (x, y) of the graphene nano-platelets are determined by direct measurement on the scanning electron microscope (SEM), after having diluted the final dispersion in a ratio of 1:1000 in deionized water and added it dropwise to a silicon oxide substrate placed on a plate heated to 100° C. and with a statistical measurement using a Malvern laser diffraction particle size analyzer, as described in the examples.

The thickness (z) of the graphene nano-platelets is determined with the atomic force microscope (AFM), which is essentially a profilometer with subnanometer resolution, widely used for characterization (mainly morphological) of the surfaces and of the nanomaterials. This type of analysis is commonly used (both for academic purposes and in industrial R&D) to evaluate the thickness of the graphene flakes, produced with any method, and to detect the number of layers forming the flake (single layer=0.34 nm).

The nano-platelets of the final dispersion, deposited as described for SEM analysis, are scanned directly with an AFM tip, where the measurement provides a topographical image of the graphene flakes and their profile with respect to the substrate, enabling precise measurement of the thickness.

The final dispersion of the graphene nano-platelets obtained after the exfoliation and size reduction treatment carried out with one or more of the methods b1) and b2) defined above can advantageously be concentrated or dried, depending on the final form required for the graphene.

In the concentrated final dispersion or in the dry form obtained after drying, at least 90% of the graphene nano-platelets preferably have a lateral size (x, y) from 100 to 25,000 nm, more preferably from 500 to 15,000 nm, and preferably a thickness (z) from 0.34 to 20 nm, more preferably from 0.34 to 8 nm.

In the present description the term "graphene nano-platelets in dry form" designates graphene nano-platelets that contains less than 2 wt % of liquid, preferably less than 1 wt % of liquid, more preferably less than 0.5 wt % of liquid.

The graphene nano-platelets with the aforesaid characteristics of size and purity, therefore with a very low oxygen content, as defined by the aforesaid C/O ratio and not functionalized with other molecules, have proved to be particularly suitable for use as a component in reinforcing compositions for elastomeric polymers for one or more inner parts of golf balls. The reinforcing agent containing the graphene nano-platelets, or consisting of the graphene nano-platelets, is uniformly dispersed and distributed in the elastomeric polymer. In this application it is possible to achieve an improvement of the dynamic-mechanical properties maintaining a good kinetic behavior with respect to compositions (compounds) with conventional reinforcing agents and good features of the vulcanized elastomer, in particular hardness and rebound resilience, as shown by the following examples.

EXAMPLES

Preparation of Compositions for the Inner Part of Golf Balls

Elastomeric compositions, also called "compounds", were prepared in a 3.2-liter closed laboratory mixer with a two-step process and rotor speed from 30 to 40 rpm, as known in the art.

The first step, lasting for a total of 5 to 6 minutes, with a heat range from 50° C. to 100° C. at discharge, consisted in the preparation of the master, which comprised all the components except for the accelerants and cross-linking agents.

The second step consisted in the addition, again in a closed internal mixer, of the accelerants and cross-linking agents for 90 seconds, with temperature from 50° C. to 80° C. at discharge, with subsequent reworking in the roll mill mixer and vulcanization in a compression press.

Examples 1-4

A reference composition was prepared in which the reinforcing agent is calcined kaolin, consisting of a typical commercial compound for golf balls, without graphene (Ex. 1, designated as REF), and three corresponding compositions according to the invention (Ex. 2, 3 and 4, designated respectively as P4, P8 and P12), having the same composition as the reference compositions except for the absence of calcined kaolin, which was substituted by graphene in the form of nano-platelets in dry form. They have lateral sizes (x-y), expressed as D90, comprised between 5000 and 10000 nm and thickness (z) from 0.34 to 4 nm. The lateral sizes were measured with the Malvern 3000 laser diffraction particle size analyzer. This graphene is manufactured by Directa Plus S.p.A. and marketed with the trade name G+®. The compositions obtained at the end of the two-step preparation process are illustrated in Table 1, where the ingredients are expressed as parts by weight per 100 parts (phr) of rubber. With reference to the reference composition (REF) of Ex. 1, it is noted that it is a typical commercial compound for the inner part of a golf ball, in which the elastomeric polymer consists of polybutadiene.

Zinc diacrylate (or dimethacrylate) is a reinforcing filler and self-crosslinking curing agent that gives the final composite high stiffness/hardness.

Stearic acid together with zinc oxide is an activator of the acceleration/crosslinking system. An appropriate blend of these two substances allows a faster and more easily controlled preparation of the elastomeric composition.

The other components are commonly present in compounds for rubbers.

TABLE 1

|  |  | EX. 1 (Ref) | EX. 2 | EX. 3 | EX. 4 |
| --- | --- | --- | --- | --- | --- |
| Elastomeric polymer | Polybutadiene | 100 | 100 | 100 | 100 |
| Reinforcing and self-crosslinking agent | Zinc diacrylate | 29 | 29 | 29 | 29 |
| Reinforcing agent | Calcined kaolin | 14 | 10 | 6 | 2 |
| Reinforcing agent | Graphene | 0 | 4 | 8 | 12 |
|  | Stearic acid | 1 | 1 | 1 | 1 |
|  | Zinc oxide | 4 | 4 | 4 | 4 |
|  | Processing adjuvants | 3 | 3 | 3 | 3 |
|  | Cross-linking agents | 2.7 | 2.7 | 2.7 | 2.7 |

The characterizations performed on the compositions indicated above comprise tests performed on the non-vulcanized compound to determine the vulcanization kinetics using an instrument called "Moving Die Rheometer" by Alpha Technologies, model MDR2000. After determining the vulcanization kinetics, samples were produced suitable for the tests for which they were destined. All the tests were performed inside the same certified laboratory, with the exception of the dynamic tests, which were performed in a specialist laboratory equipped with special instruments.

The kinetics of all the compounds produced are indicated in Table 2.

TABLE 2

| Rheometer curve | UM | Ex. 1 (Ref) | Ex. 2 | Ex. 3 | Ex. 4 |
| --- | --- | --- | --- | --- | --- |
| ML | dNm | 1.97 | 1.89 | 1.89 | 1.93 |
| MH | dNm | 221.73 | 198.06 | 204.93 | 197.81 |
| Crosslinking density (MH − ML) | dNm | 219.76 | 196.17 | 203.04 | 195.88 |
| ts2 | min | 0.39 | 0.37 | 0.43 | 0.41 |
| t90 | min | 1.81 | 1.83 | 2.44 | 2.30 | where:
ML: minimum value of the torque expressed in dNm during the vulcanization kinetic.
MH: maximum value of the torque expressed in dNm during the vulcanization kinetic.
ts2: increase of 0.2 dNm with respect to the value of ML and expressed in minutes.
t90: [(MH − ML) * 0.9] + ML, optimal vulcanization time corresponding to 90% of the degree of crosslinking.
UM: Unity of Measurement.

From the Table it can be seen that fundamentally there are no substantial differences in the behavior of the compounds containing graphene according to the invention with respect to the reference compound REF.

Figure 2:
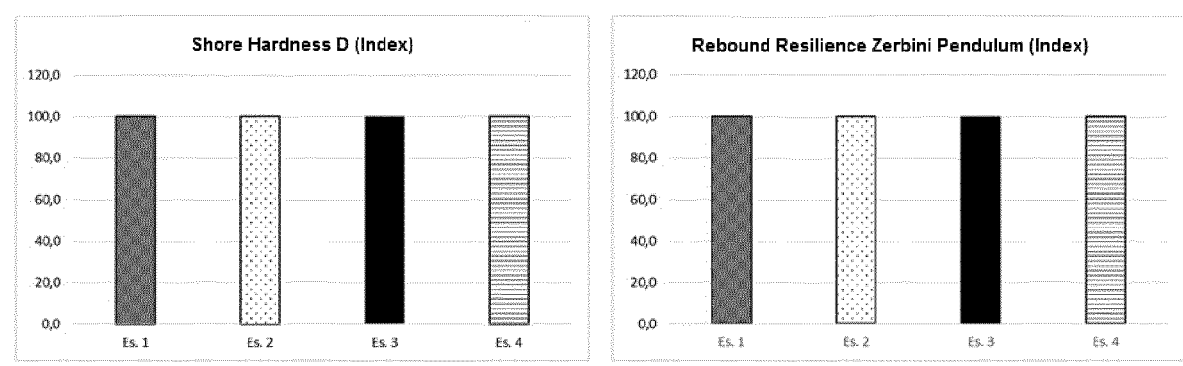
FIGS. 2-5 are graphs illustrating properties of elastomeric compositions for golf balls according to the prior art and according to the invention.

With regard to the features of the vulcanized elastomer it can be seen that the data relating to the hardness tests (in Shore D) and rebound resilience (using a Zerbini Pendulum) are to be considered aligned with respect to the reference compound, as shown in FIG. 2.

The vulcanization kinetics were determined with the method ISO 3417.

Hardness was measured with the method ISO 868.

Rebound resilience was measured with the method ISO 4662.

Analysis of the dynamic-mechanical properties correlated to behavior during all the stages of the "swing", i.e., the movement used in all hits to launch the ball toward the target causing it to lift, with the dynamic tests according to Payne, called "Payne Effect".

The Payne effect analyzes the trend of the dynamic modulus ("storage modulus" E' or G' expressed in MPa) as a function of the deformation expressed in percentage (%), set at a test frequency and temperature. High elastic modulus values at low deformation rates ensure improved behavior in the long distances of the swing, while the elastic modulus at high deformation rates, where the values are lower compared to those at low deformation rates, can be correlated to control of the ball itself during the shot.

Dynamic-mechanical analyses (DMA) were performed by means of a 3-point bending test with a light constant preload with the instrument TA Q800, in the following operating conditions: constant temperature of 60° C., frequency equal to 1 Hz, dynamic deformation from 0 to 1%.

Figure 3:
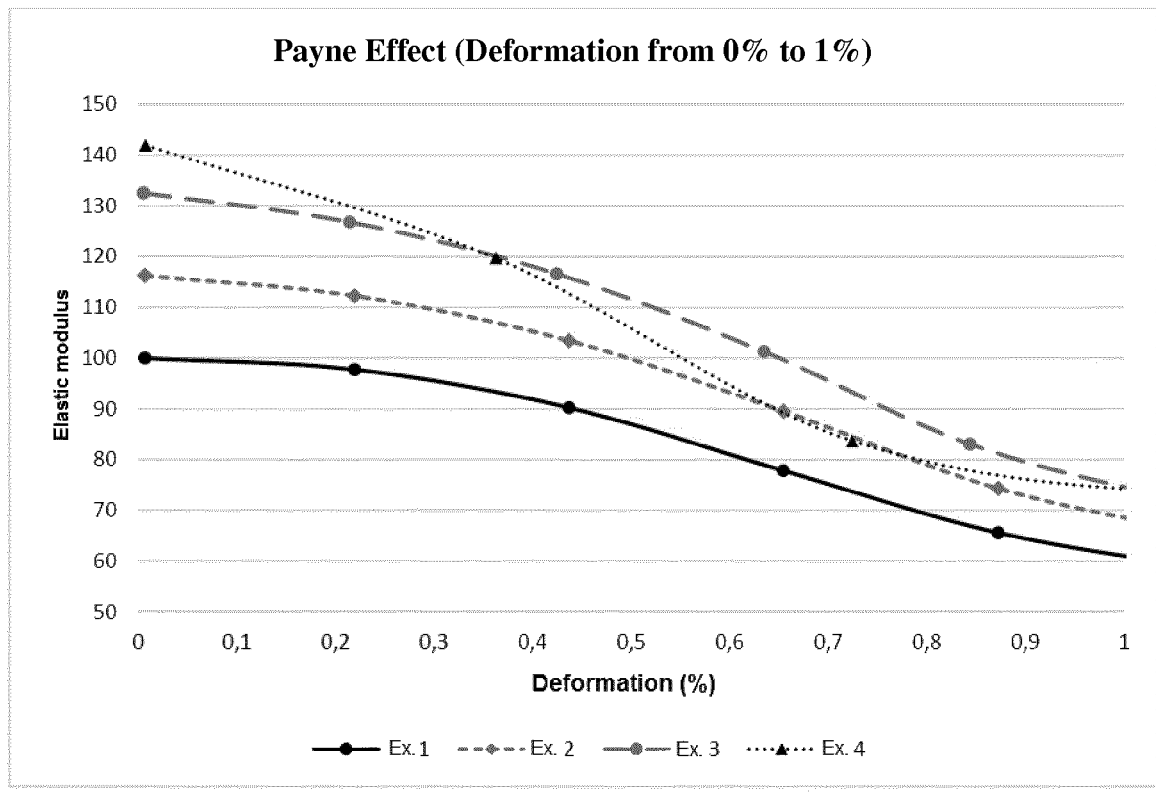
Figure 4:
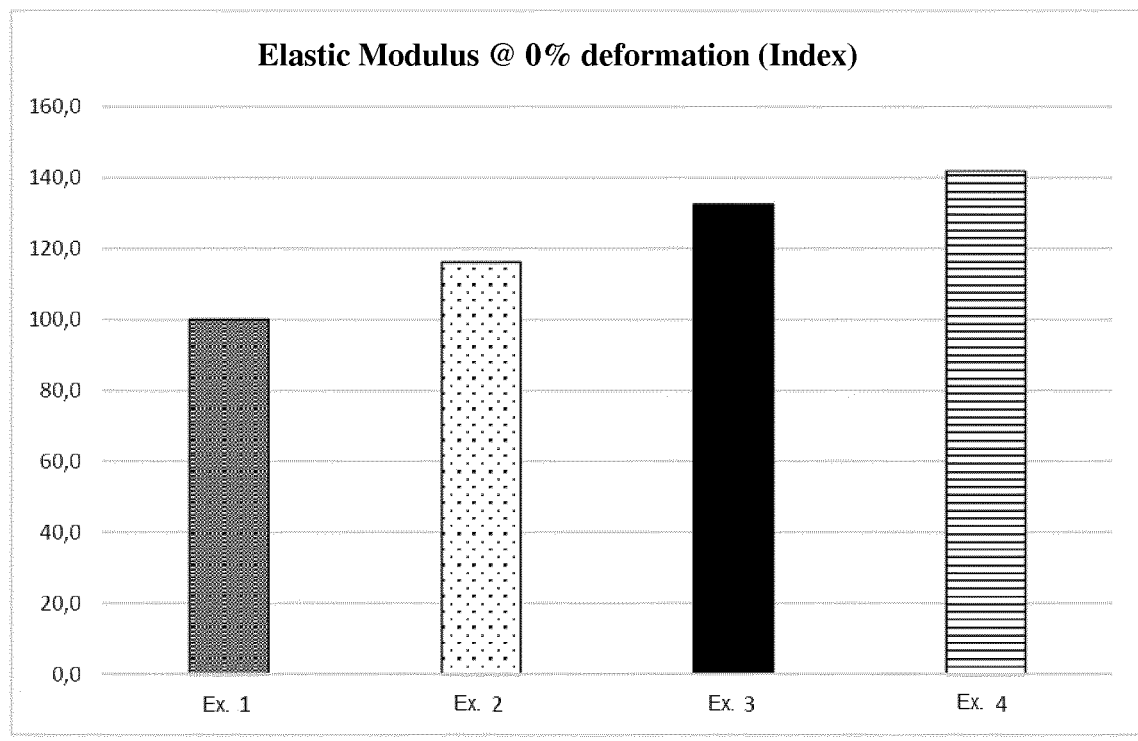

FIGS. 3 and 4 show a noteworthy phenomenon due to the particular interaction between the graphene in the form of nano-platelets of the reinforcing composition and the elastomeric polymer.

Observing the curves/histogram relating to the various compounds of Examples 1-4, a progressive increase of the elastic modulus (storage modulus) is seen in the formulations containing graphene. This phenomenon is more evident in Ex. 4, containing 12 phr of graphene. In fact, the values of E' at low deformations are increased by 16% to 42% with respect the reference example 1 REF. This allows a greater distance of the shot to be obtained with golf balls containing graphene according to the invention.

Figure 5:
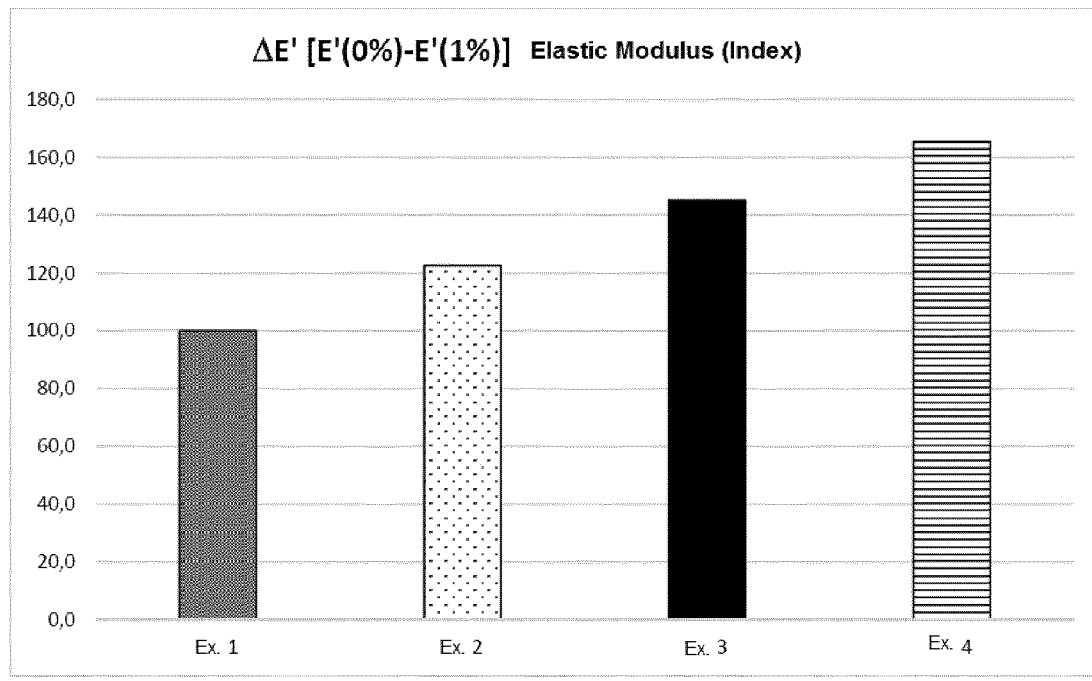

If the values of the elastic modulus at higher deformations (close to 1%) are analyzed, another interesting phenomenon is observed: the values of drop in the elastic modulus (ΔE') from deformation 0% to deformation equal to 1% are greater in Examples 2-4 containing graphene in the form of nano-platelets (FIG. 5). This result ensures a better control of the golf ball during the swing.

The results discussed above show that the use of graphene in the form of nano-platelets according to the invention in compounds for the production of golf balls allows new types of balls to be produced both for professionals and for amateurs. In fact, it is possible to use graphene to produce professional balls with a very stiff core in order to obtain a good distance of the shot without loss of control, just as it is possible to use high levels of graphene, for example in an amount of 12 phr, to produce balls for amateurs, in order to ensure an effective swing with good control, due to the ability of graphene to reduce the elastic modulus of the elastomeric composition at the end of the shot.

Examples 5-7

In these examples the behavior of different types of graphene in a formulation based on natural rubber containing various special additives was compared.

Formulations suitable for the comparative study of the various types of graphene were chosen in order to show any differences in performance linked to their morphology and/or structure.

As for the previous examples, an elastomeric composition, also called "compound", was prepared in a 3.2-liter closed laboratory mixer with a two-step process and rotor speed from 30 to 40 rpm. The first step, lasting for a total of 5 to 6 minutes, with a heat range from 50° C. to 100° C. at discharge, consists in the preparation of the master, which comprises all the components except for the accelerants and cross-linking agents.

The second step consists in the addition, again in a closed internal mixer, of the accelerants and cross-linking agents for 90 seconds, with temperature from 50° C. to 80° C. at discharge, with subsequent reworking in the roll mill mixer and vulcanization in a compression press. Subsequently, samples were produced suitable for the tests for which they were destined.

Table 3 shows the compositions analyzed, where the ingredients are expressed in parts by weight per 100 parts (phr) of rubber.

TABLE 3

|  | EX. 5 (REF) | EX. 6 (G+®) | EX. 7 (C) |
| --- | --- | --- | --- |
| Natural Rubber | 100 | 100 | 100 |
| Stearic acid | 1.5 | 1.5 | 1.5 |
| Zinc oxide | 4 | 4 | 4 |
| Antioxidants: | 1 | 1 | 1 |
| Graphene G+® | 0 | 10 | 0 |
| Graphene C | 0 | 0 | 10 |
| Process oil | 0 | 1 | 1 |
| Accelerants | 1.25 | 1.25 | 1.25 |
| Cross-linking agents | 2.5 | 2.5 | 2.5 |

Ex. 5 is a reference example in which no reinforcing agent was used.

In Ex. 6 a reinforcing agent consisting of 10 phr of graphene according to the invention, produced by Directa Plus S.p.A. and marketed with the trade name G+, was used, having lateral sizes (x-y), expressed as D90, from 5000 to 10000 nm and thickness (z) from 0.34 to 4 nm. The lateral sizes were measured using the Malvern 3000 laser diffraction particle size analyzer.

In Ex. 7 a reinforcing agent consisting of 10 phr of a commercial graphene purchased on the market, designated as Graphene C, was used. It had lateral sizes (x-y), expressed as D90, from 5000 to 7000 nm and thickness (z) from 50 to 100 nm, as declared in the technical data sheet (TDS) provided by the manufacturer.

Figure 6:
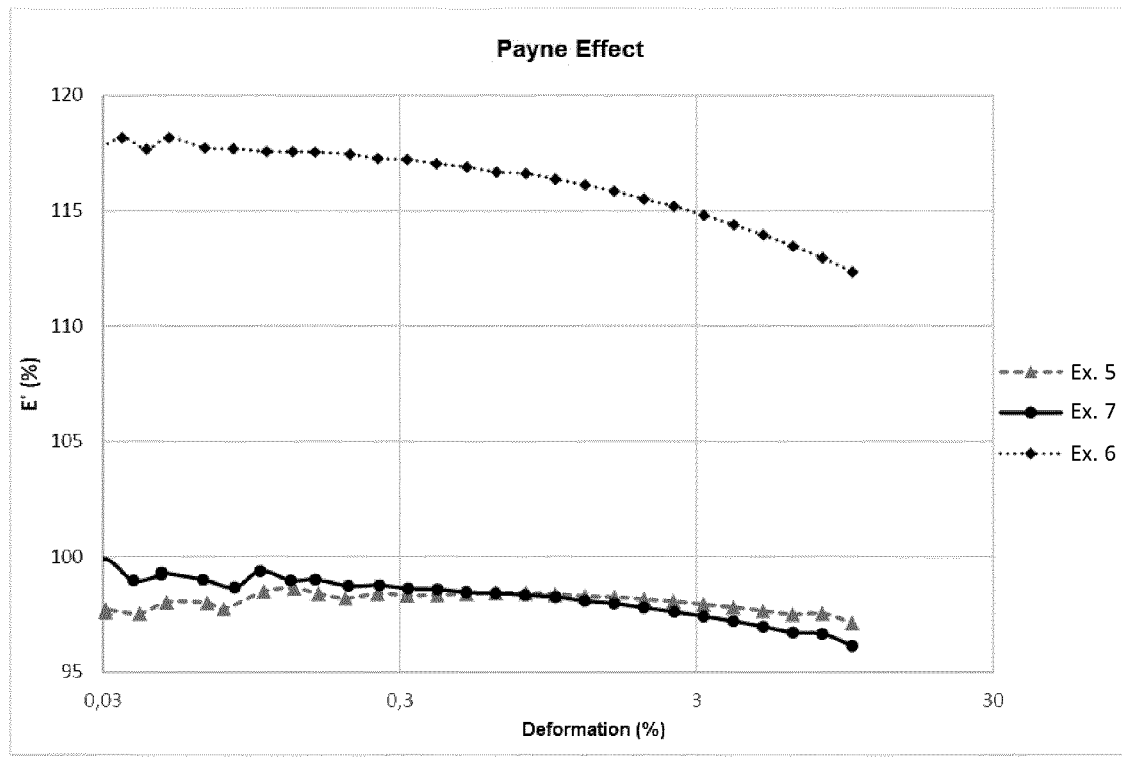
FIG. 6 is another graph illustrating properties of elastomeric compositions for golf balls incorporating graphene according to the prior art and according to the invention.

Dynamic-mechanical analyses (DMA) were performed by means of a torsion test with a light constant preload using the instrument TA Q800, in the following operating conditions: constant temperature of 60° C., frequency equal to 1 Hz, dynamic deformation from 0 to 10%. FIG. 6 indicates the dynamic-mechanical tests (Payne Effect). From the graph it can be seen that the elastic modulus in the whole of the deformation range, of the composition containing graphene G+® is higher both with respect to the reference composition and with respect to the composition containing the commercial graphene C, which offers performances substantially equal to those of the reference sample without graphene.

The invention claimed is:

1. A golf ball comprising:
   an inner part comprising at least an elastomeric polymer and at least a reinforcing agent, and
   an outer part comprising at least a coating layer provided with dimples;
   said reinforcing agent of said inner part comprising graphene nano-platelets dispersed within said inner part, said graphene nano-platelets having the following features:

i) at least 90% of said graphene nano-platelets has a lateral size from 100 nm to 25,000 nm and a thickness from 0.34 nm to 20 nm, wherein the lateral size is greater than the thickness;
ii) a carbon/oxygen (C/O) ratio in said graphene nano-platelets greater than or equal to 100:1;
said inner part having an elastic modulus with a deformation rate range of from about 0.01% to 1.0% and an about 16% to 42% higher elastic modulus than the inner part without the graphene nano-platelets; and
said inner part having a decrease of the elastic modulus at a deformation rate starting at about 1.0% that is greater than the inner part without the graphene nano-platelets.

2. The golf ball of claim 1, wherein at least 90% of said graphene nano-platelets has a lateral size from 500 nm to 15000 nm and a thickness from 0.34 nm to 8 nm.

3. The golf ball of claim 1, further comprising a CIO ratio in said graphene nano-platelets of greater than or equal to 200:1.

4. The golf ball of claim 1, wherein said graphene nano-platelets are present in an amount from 1 phr to 50 phr with respect to said elastomeric polymer of said inner part.

5. The golf ball of claim 4, wherein said graphene nano-platelets are present in an amount from 2 phr to 30 phr with respect to said elastomeric polymer.

6. The golf ball according to claim 5, wherein said graphene nano-platelets are present in an amount from 2 phr to 20 phr with respect to said elastomeric polymer of said inner part.

7. The golf ball of claim 1, wherein said inner part further comprises a spherical core.

8. The golf ball of claim 7, wherein said inner part further comprises one or more intermediate layers located between said spherical core and said outer part, wherein said reinforcing agent comprising said graphene nano-platelets is in said one or more intermediate layers.

9. The golf ball of claim 1, wherein said elastomeric polymer is selected from the group consisting of polybutadiene, natural rubber, polyisoprene, styrene-butadiene rubber (SBR), ethylene-propylene-diene (EPDM) rubber and combinations thereof.

10. The golf ball of claim 1, wherein said elastomeric polymer comprises polybutadiene.

11. A golf ball comprising:
an inner part comprising at least an elastomeric polymer and at least a reinforcing agent, and
an outer part comprising at least a coating layer provided with dimples;
said reinforcing agent of said inner part comprising graphene nano-platelets dispersed within said inner part, said graphene nano-platelets having the following features:
i) at least 90% of said graphene nano-platelets has a lateral size from 5,000 nm to 25,000 nm and a thickness from 0.34 nm to 20 nm, wherein the lateral size is greater than the thickness;
ii) a carbon/oxygen (C/O) ratio in said graphene nano-platelets greater than or equal to 100:1;
said inner part having an elastic modulus with a deformation rate range of from about 0.01% to 1.0% and an about 16% to 42% higher elastic modulus than the inner part without the graphene nano-platelets; and
said inner part having a decrease of the elastic modulus at a deformation rate starting at about 1.0% that is greater than the inner part without the graphene nano-platelets.

12. The golf ball of claim 11, wherein at least 90% of said graphene nano-platelets has a lateral size from 5,000 nm to 10,000 nm and a thickness from 0.34 nm to 8 nm.

13. The golf ball of claim 11, further comprising a C/O ratio in said graphene nano-platelets of greater than or equal to 200:1.

14. The golf ball of claim 11, wherein said graphene nano-platelets are present in an amount from 1 phr to 50 phr with respect to said elastomeric polymer of said inner part.

15. The golf ball of claim 14, wherein said graphene nano-platelets are present in an amount from 2 phr to 30 phr with respect to said elastomeric polymer of said inner part.

16. The golf ball of claim 15, wherein said graphene nano-platelets are present in an amount from 2 phr to 30 phr with respect to said elastomeric polymer of said inner part.

17. The golf ball of claim 11, wherein said inner part further comprises a spherical core.

18. The golf ball of claim 17, wherein said inner part further comprises one or more intermediate layers located between said spherical core and said outer part, wherein said reinforcing agent comprising said graphene nano-platelets is in said one or more intermediate layers.

19. The golf ball of claim 11, wherein said elastomeric polymer is selected from the group consisting of polybutadiene, natural rubber, polyisoprene, styrene-butadiene rubber (SBR), ethylene-propylene-diene (EPDM) rubber and combinations thereof.

20. The golf ball of claim 11, wherein said elastomeric polymer comprises polybutadiene.

* * * * *